April 26, 1966  B. BRODSKY ETAL  3,248,011
LIQUID DISPENSER WITH TIMER CONTROL
Filed Feb. 19, 1964  4 Sheets-Sheet 1
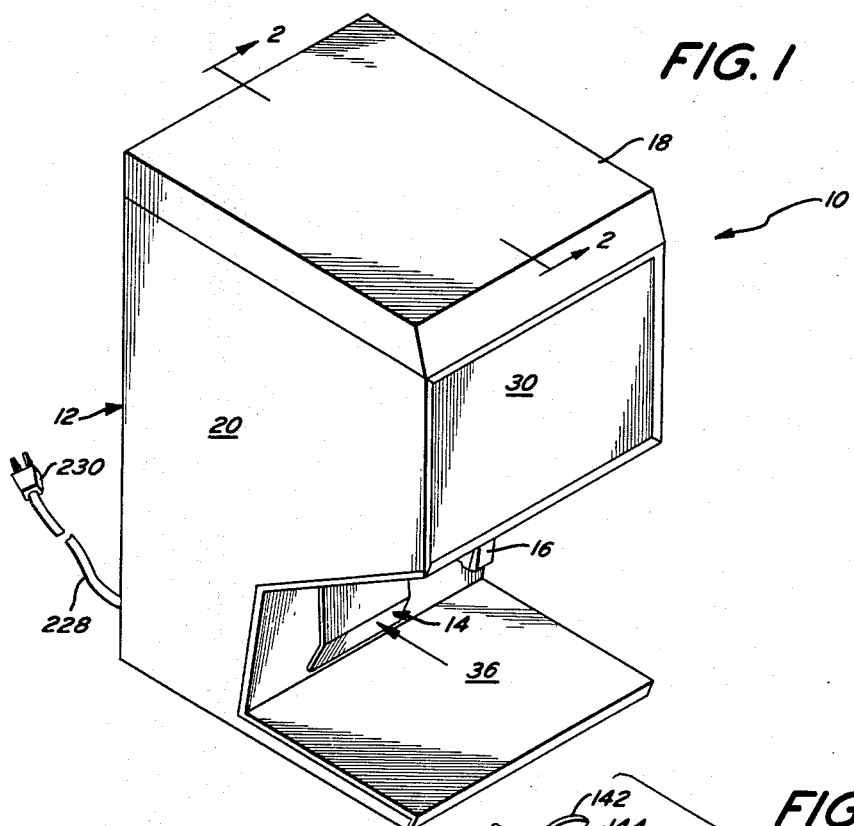
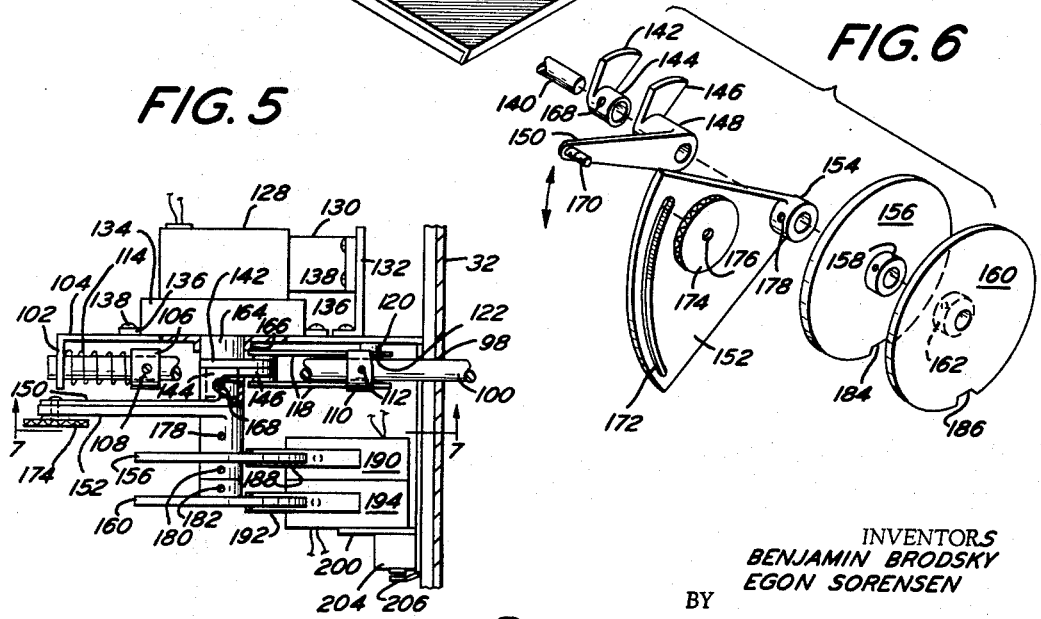
INVENTORS
BENJAMIN BRODSKY
EGON SORENSEN
BY
Caesar and Rivise
ATTORNEYS.

April 26, 1966 B. BRODSKY ETAL 3,248,011
LIQUID DISPENSER WITH TIMER CONTROL
Filed Feb. 19, 1964 4 Sheets-Sheet 2

INVENTORS
BENJAMIN BRODSKY
EGON SORENSEN
BY
Caesar and Rivise
ATTORNEYS.

April 26, 1966  B. BRODSKY ETAL  3,248,011
LIQUID DISPENSER WITH TIMER CONTROL
Filed Feb. 19, 1964  4 Sheets-Sheet 3

INVENTORS
BENJAMIN BRODSKY
EGON SORENSEN
BY Caesar and Rivise
ATTORNEYS.

INVENTORS
BENJAMIN BRODSKY
BY EGON SORENSEN

Caesar and Rivise

ATTORNEYS.

United States Patent Office 3,248,011
Patented Apr. 26, 1966

3,248,011
LIQUID DISPENSER WITH TIMER CONTROL
Benjamin Brodsky, Laverock, and Egon Sorensen, Willow Grove, Pa., assignors to Progressive Metal Equipment, Inc., Philadelphia, Pa., a corporation of Pennsylvania
Filed Feb. 19, 1964, Ser. No. 345,937
28 Claims. (Cl. 222—70)

This invention relates to a dispenser for liquid. More particularly, it is especially adapted to the storage and dispensing of cream for use in restaurants.

At the present time cream for coffee in restaurants and at snack counters is stored and dispensed from a canister-type container having a valve therein. The container has insulated walls and an inner vessel which contains the cream. The cream is kept cold by ice which is packed in a separate container and placed on top of the cream vessel or by a ring-shaped jacket which contains an eutectic hold-over solution which is cooled in a standard refrigerator and placed around the inner vessel.

A lever arm is positioned at the bottom of the canister. The raising of this lever arm opens a valve within the canister thereby permitting the dispensing of cream by gravity.

A number of problems have arisen by the use of the aforementioned cream dispenser. The first is the possibility of spoilage of the cream should the employees forget to repack the container with ice during the course of a day. This is also possible if cream is to be left in the dispenser over night.

Another problem is that the valve arrangement is not drip-proof. Thus, quite often, it is necessary to place a dish under the cream dispenser to catch the drippings after the coffee cup has been removed. The amount of cream dispensed from this prior art dispenser is pre-set by means of a mechanical portion control. The disadvantage of this control is that the cream is in direct contact with the various mechanisms, and therefore it does not constitute a sanitary arrangement. Additionally, before any adjustment in the controls can be made, it is necessary to remove all of the cream.

All of the aforementioned problems are solved by the dispenser of the instant invention. Thus, rather than providing the use of ice for keeping the cream cool, the dispenser of this invention relies on electrical refrigeration. In this way there is no fear of inadvertently neglecting to replenish the ice since the refrigeration system will insure that the cream is kept cold at all times.

Another feature of this invention is the fact that the valve is drip-proof. Additionally the valve is electrically actuated and delivers a pre-determined amount of cream each time it is actuated. This pre-determined amount of cream is adjustable externally of the cream vessel to suit the needs of a particular user.

It is therefore an object of this invention to provide a novel dispenser.

It is another object of this invention to provide a dispenser that is electrically cooled.

It is a further object of this invention to provide a dispenser wherein a valve is electrically actuated.

It is a further object of this invention to provide a dispenser wherein a valve is electrically actuated and the amount of liquid passing through the valve is adjustable to a set amount.

It is a further object of this invention to provide a dispenser wherein means are provided for automatically closing the valve after a pre-determined amount of liquid has passed through the valve.

These and other objects are accomplished by providing a dispenser comprising a casing, a vessel mounted within said casing for containing liquid, means for delivering liquid from said vessel, valve means on said delivery means, means for actuating said valve means, and adjustable means which are external of said vessel for automatically closing said valve means after a set amount of liquid has passed through said valve means.

Other objects and many of the attendant advantages of this invention will be readily appreciated as the same becomes better understood by reference to the following detailed description when considered in connection with the accompanying drawings wherein:

FIG. 1 is a perspective view of the dispenser of this invention;

FIG. 5 is a top plan view, partially broken away for the purpose of clarity, of the valve closing mechanism of this invention;

FIG. 6 is an exploded perspective view of the elements of the valve closing mechanism of FIG. 5;

Figure 2:
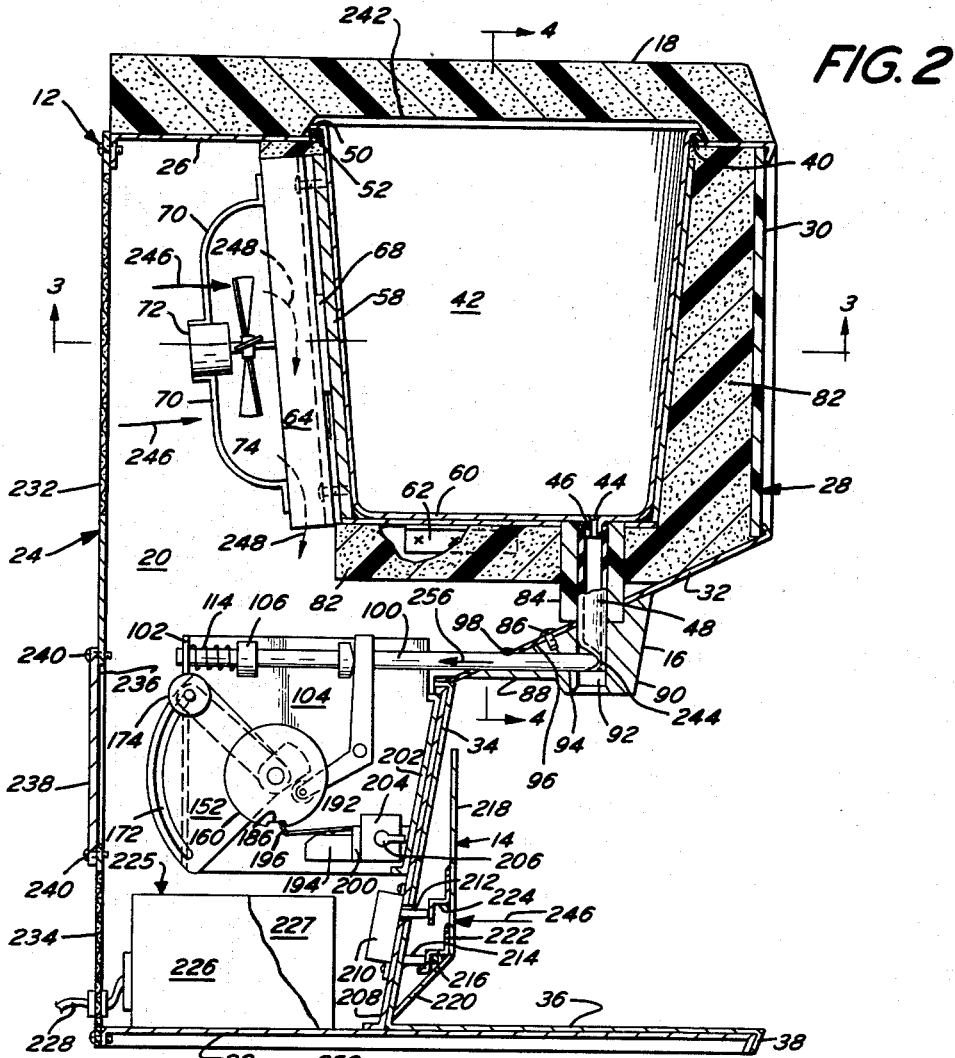
FIG. 2 is an enlarged sectional view taken along the line 2—2 of FIG. 1.

Referring now in greater detail to the various figures of the drawings wherein similar reference characters refer to similar parts, a dispenser embodying the present invention is generally shown at 10 in FIG. 1. Device 10 basically comprises a housing 12, an actuating plate 14, a valve housing 16, and a removable cover 18.

As best seen in FIGS. 1 and 2 housing 12 includes a pair of side walls 20, a bottom platform 22, a back plate 24, a top plate 26, and a front 28. Front 28 includes an upper plastic vertical portion 30. This portion can be made in various colors and can be provided with either decorations, the name of the restaurant, or an identifying trade-mark for the dispenser. Front portion 28 additionally includes a downwardly inclined plate 32 immediately below plastic plate 30, and a second inclined plate 34 connecting plate 32 with platform 22. Plate 34 includes a horizontal portion 36 having an inclined flange 38 at its end for the purpose of decoration. Portion 36 abuts platform 22.

The top plate 26 is provided with a square opening 40. The purpose of this opening is to receive a vessel 42 which is adapted to hold liquid such as cream. The bottom of vessel 42 is provided with an opening 44. This opening extends into annular boss 46 at the bottom of vessel 42. Telescoped over boss 46 and frictionally held thereon is a flexible tube 48 which is preferably made of rubber. Vessel 42 is removably mounted in opening 40 and is easily lifted out. The vessel is held in place by outwardly extending lip 50 which passes around the entire upper perimeter of the vessel. As seen in FIG. 2, the lip 50 extends out sufficiently far to rest on the upper surface of plate 26, thereby preventing the vessel from falling into the hole. As further seen in FIG. 2, lip 50 is spaced from plate 26 by a square insulation loop 52, for a purpose to be explained hereinafter. Loop 52 can be made of any material that will not readily conduct heat, such as plastic. Thus, Bakelite and many of the vinyl plastics can be used.

Figure 3:
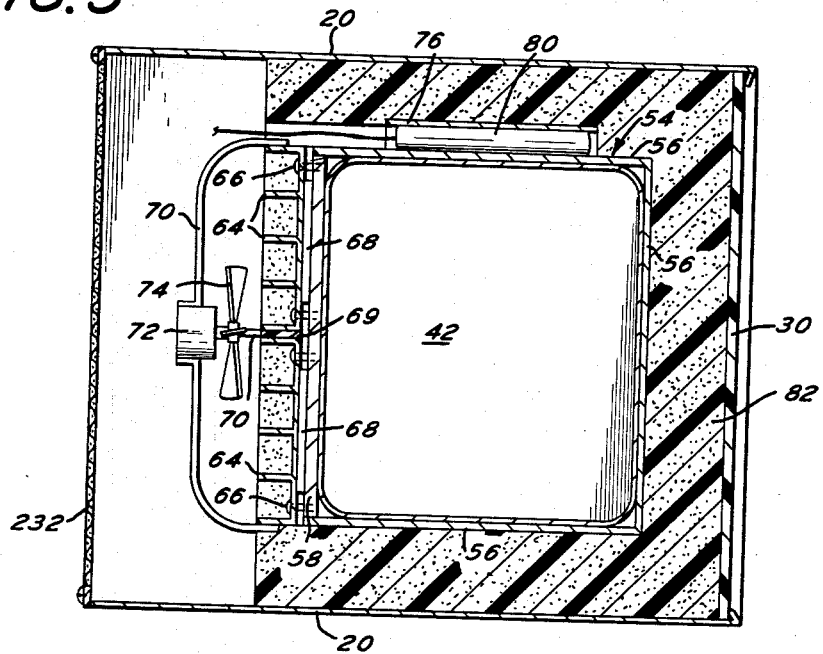
FIG. 3 is a sectional view taken along the line 3—3 of FIG. 2.
Figure 4:
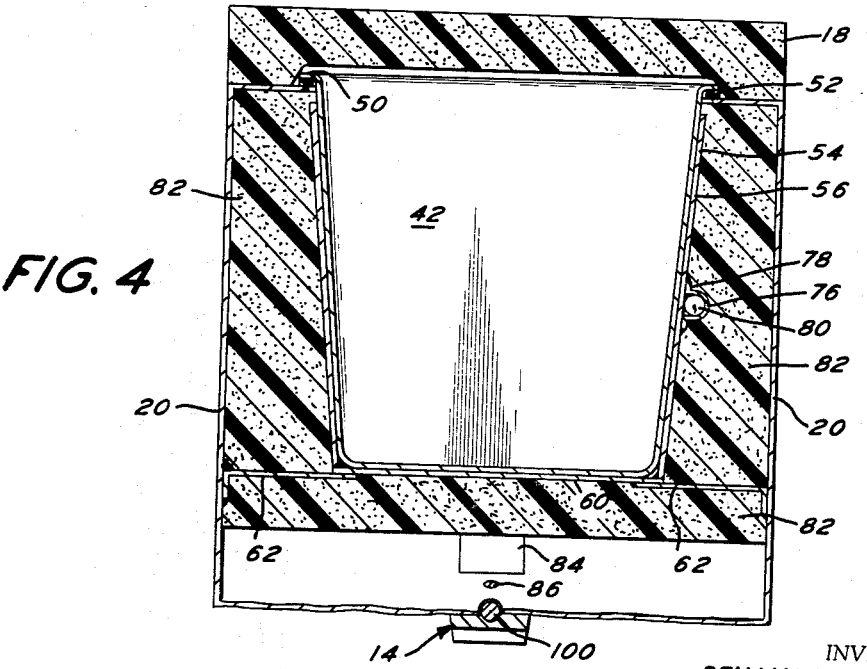
FIG. 4 is a sectional view taken along the line 4—4 of FIG. 2.

As seen in FIGS. 2, 3 and 4, vessel 42 is also supported by metallic container 54 which is of the same shape as vessel 52 but is slightly larger. As seen in FIG. 3 container 54 has three relatively thin walls 56 with a thickened rear wall 58. The bottom 60 is of the same thickness as walls 56. As seen in FIGS. 2 and 4, bottom 60 is supported by angle brackets 62 which are riveted or welded onto walls 20.

As seen in FIGS. 2 and 3, a plurality of cooling fins 64 are mounted on the rear plate 58 by bolts 66. Thus one of the purposes of having the rear plate which is thicker is to receive the bolts 66 in order to support the cooling fins. As seen in FIG. 3, the cooling fins comprise a series of U-shaped members with the bridging section of the series comprising a flat plate which is adjacent rear wall 58. The cooling fins can be made of any heat conductive material. However, copper is preferred because of its high heat conductivity.

Mounted between the cooling fins 64 and rear plate 58 are a pair of thermoelectric modules 68. These modules are frictionally held in place between fins 64 and plate 68 by bolts 66. Thermoelectric modules have recently become popular in many areas where mechanical refrigeration has previously been used. These modules possess numerous advantages over mechanical refrigeration. The biggest of these advantages is the fact that no moving parts are necessary to obtain the necessary cooling. The basic theory behind the thermoelectric module cooling is that the passage of electric current through the metallic thermocouple results in the transfer of heat from one metal to the other. The discovery of semiconductor thermoelectric materials has made the use of thermoelectric cooling practical for obtaining large temperature variances. Any of the commercial thermoelectric modules can be used with this invention. Thus module No. TA-84-30 made by Ohio Semiconductors, Columbus, Ohio, has effectively been used. Also, Malcor type CP2-31-10 module made by Materials Electronic Products Corporation of Trenton, New Jersey, could be used. As seen in FIG. 3, cooling fins 64 are separated into separate units for each module 68 by strip insulator 69.

Mounted on cooling fins 64 are brackets 70 which support a fan motor 72 and electric fan 74. Mounted on one plate 56 is a U-shaped metallic member 76 (FIG. 4) with the open portion being adjacent plate 56. A pair of flanges 78 project outwardly from the legs of the U and are welded to plate 56. Mounted within member 76 is a thermostat bulb 80.

Surrounding container 54 and fins 64 is an insulating foam 82. This foam is pumped in around container 54 and the fins in a pasty state and the rigid foam material is formed in situ. The foam can be any of the well known insulating foams, such as polystyrene or polyurethane. After the foam is solidified, it is cut and shaped as shown in FIGS. 2, 3 and 4.

Secured in an opening of bottom plate 60 of container 54 is a metallic sleeve 84 (FIG. 2). Sleeve 84 has an internal diameter which is slightly larger than the external diameter of compressible tube 48. As seen in FIG. 2 tube 48 projects through sleeve 84. The lower edge of sleeve 84 passes through inclined front plate 32 and into a recess formed in valve housing 16. As seen in FIG. 2 valve housing 16 is mounted on plate 32 by screw 86.

Valve housing 16 has a bi-planar horizontal surface 88 and an inclined front surface 90. Valve housing 16 includes a vertical bore 92 which has the same diameter of and is aligned with sleeve 84. Thus, as seen in FIG. 2, compressible tube 48 passes through sleeve 84 and into bore 92. Valve housing 16 also includes a circular horizontal bore 94 which is in communication with vertical bore 92 and passes through the upper inclined side 96 of valve housing 16. Inclined plate 32 has a hole 98 formed therein which is aligned with bore 94.

Slidably mounted in bore 94 and passing through hole 98 is a reciprocable circular rod 100. As seen in FIGS. 2 and 5, rod 100 passes through a hole in flange 102 of vertical supporting plate 104. Rod 100 has a collar 106 telescoped thereover which is adjustably held in place by set screw 108. A second collar 110 is telescoped over the rod and adjustably held in place by set screw 112. A coiled compression spring 114 is telescoped over the rear of rod 100 and bears against flange 102 and collar 106.

Figure 7:
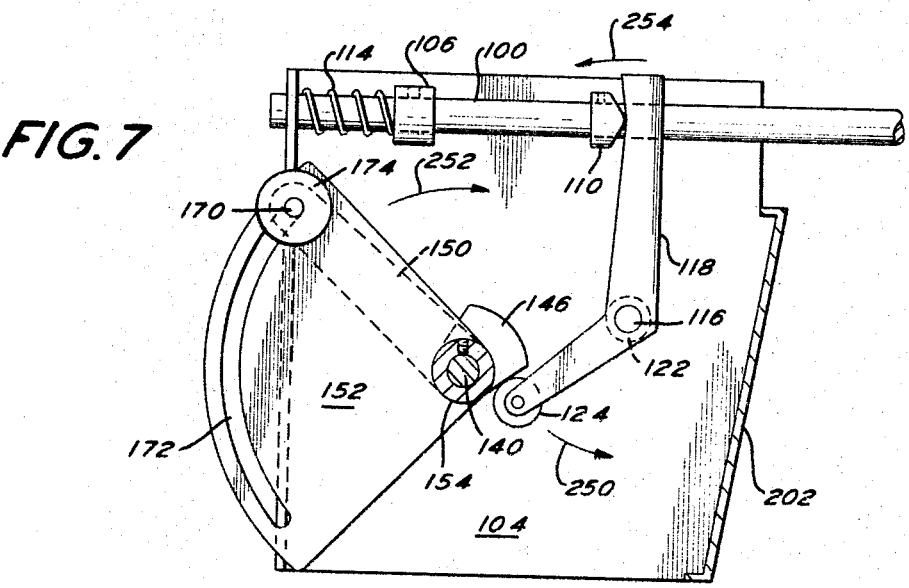
FIG. 7 is a side elevational view of the metering cam shown in its smallest circumference.
Figure 8:
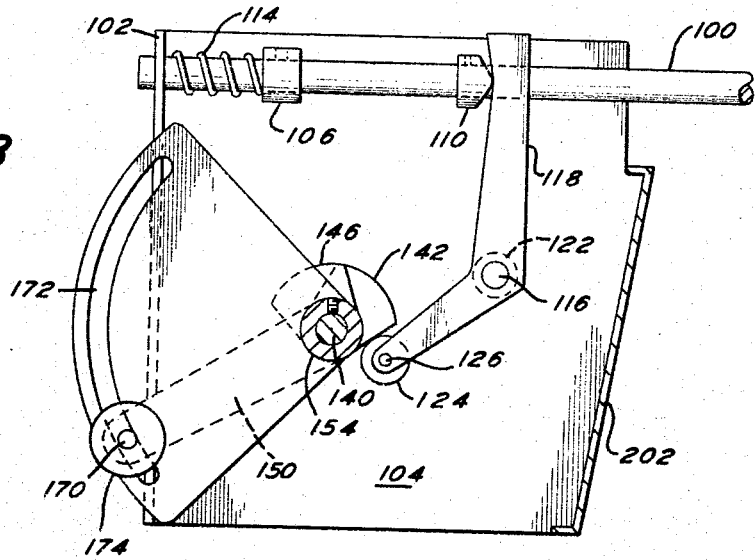
FIG. 8 is a side elevational view similar to FIG. 7, but showing the metering cam in a larger dimension.

Mounted on pin 116 are a pair of angular pivot arms 118. As seen in FIG. 5, pin 116 is mounted on vertical wall 104. As best seen in FIGS. 7 and 8, each pivot arm 110 comprises a vertical section and a downwardly extending section which is arranged at approximately a 135° angle with respect to the vertical section. As seen in FIG. 5, a bearing sleeve 120 spaces one pivot arm from wall 104. A second bearing sleeve 122 spaces the two pivot arms. As seen in FIG. 5, the second bearing sleeve is slightly greater in width than the diameter of rod 100. Pivot arms 118 are thus positioned on opposite sides of rod 100. The lower ends of pivot arms 118 are spaced by a roller 124 which is rotatably mounted on pin 126 which is secured in the pivot arms.

An electric motor 128 is supported by brackets 130 and 132 which are in turn supported by vertical wall 104. A gear box 134 is connected to motor 128 and is supported by wall 104 by flanges 136 and screws 138. Shaft 140 (FIG. 6) coming out of the gear box passes through wall 104.

As seen in FIG. 6 shaft 140 has telescoped thereover a cam 142 having a tubular boss 144, a second cam 146 having a tubular boss 148 and a pivot arm 150, a cam adjustment plate 152 having a tubular boss 154, a disk 156 having a tubular boss 158 and a disk 160 having a tubular boss 162. The exact arrangement of these elements is seen in FIG. 5. Thus gear box 134 includes a bearing sleeve 164 which passes through an opening and annular flange 166 in wall 104. Output shaft 140 of the gear box passes through bearing sleeve 164. Boss 144 is then telescoped over shaft 140 and cam 142 is held in place by set screw 168. Boss 148 is then telescoped over shaft 140 and over boss 144. As seen in FIG. 5, cams 142 and 146 will then be abutting. Thereafter boss 154 is telescoped over shaft 140 until plate 152 abuts arm 150. Threaded pin 170 on the outer end of arm 150 passes through arcuate slot 172 in plate 152. Arm 150 is maintained against plate 152 by knurled disk 174 having threaded hole 176. Thus, as is apparent from FIGS. 5 and 6, boss 148 is freely rotatable over boss 144. However, plate 152 is held in place on shaft 140 by set screw 178. Thus the angular alignment of arm 150 is set. Thereafter disk 174 is threaded on to pin 170 and tightened until arm 150 abuts plate 152. Since the plate is fixed on shaft 140, arm 150 and its associated cam 146 will be similarly fixed by securement against the plate.

Disk 156 is secured on shaft 140 by set screw 180 and disk 160 is secured on shaft 140 by set screw 182. As seen in FIG. 6, disks 156 and 160 are provided with recesses 184 and 186, respectively, in their circumferences, for a purpose to be described hereinafter.

As seen in FIGS. 2 and 5, disk 156 is in contact with resilient finger 188 of microswitch 190. Likewise, disk 160 is in contact with resilient finger 192 of microswitch 194. As seen in FIG. 2, finger 192 includes a lip 196 which is received in recess 186 of disk 160. Likewise, as shown schematically in FIG. 9, finger 188 includes a lip 198 which is received in recess 184 of disk 156. Microswitches 190 and 194 are mounted on vertical plate 200 which is in turn secured to substantially vertical plate 202 forming a projection from wall 140 (see FIGS. 7 and 8). A relay 204 having a contact arm 206 is also mounted on plate 200.

As seen in FIG. 2 a plate 208 is positioned between plates 202 and 34 and abuts both of said plates. A manual switch 210 is mounted on plate 208. A springloaded contact finger 212 extends from said switch and passes through an opening formed in plates 208 and 34. A U-shaped bracket having legs 214 and a bridging section 216 projects horizontally outward from plate 34.

Contact plate 14 having vertical face 218 and inclined face 220 is mounted on bridging section 216 by bracket 222. Bracket 222 is welded to plate 14 and is made of a resilient material such as spring steel. In assembly, the plate 14 is snapped over bridging section 16 and is held in place thereon. Spring finger 212 abuts bracket 224 which is welded on the inner face of plate 14. The spring finger aids in resiliently holding plate 14 in the position shown in FIG. 2. The abutment of the lower edge of face 220 against wall 34 serves as a stop for the plate when it is urged outwardly by spring finger 212.

A power conversion and transformer system 225 which includes a transformer 226, a pair of rectifiers (not shown) and a choke 227 is mounted on base platform 22. A suitable electric cord 228 passes through rear wall 24 and has an electric plug 230 (FIG. 1) at its end.

As seen in FIG. 2 back plate 22 includes foraminous section 232 at the top thereof and foraminous section 234 at the bottom thereof. These sections are preferably made of an open-mesh screen. The lower portion of back plate 24 is provided with an opening 236 which is sufficiently large to permit the insertion of a human hand therethrough. This opening is covered by plate 238 which is held in place by screws 240.

Top 18 is made of an insulating rigid foam material, such as polyurethane or polystyrene. The outer surface is smooth and cut to follow the general contours of the dispenser, as best seen in FIG. 1. If desired, the foam can be covered with a facing layer of decorative metal such as aluminum or stainless steel. Alternatively the foam can be finished with a pigmented coating for the purpose of attractiveness. As seen in FIG. 2, cover 18 is readily removable merely by lifting it from the position shown. The cover is provided with a square recess 242 in its lower surface. This recess is slightly larger than the outer perimeter of vessel 42, thereby permitting the cover to be placed over the vessel and completely surround it.

In use, cover 18 is removed and the desired liquid, such as cream, is placed in vessel 42. The cover 18 is then replaced. The liquid will flow by gravity through opening 44 and into compressible tube 48. Rod 100 is freely slidable in bore 94. Thus the action of compression spring 114 against collar 106 and flange 102 forces the rod against tube 48 thereby pinching the tip completely closed, as shown at 244 in FIG. 2. With the rod in the position shown in FIG. 2 there is no leakage or dripping from the tube. Therefore the valve arrangement serves as a drip-proof valve.

The liquid within vessel 42 is cooled by thermoelectric modules 68. Thus the cold side of the modules is in contact with plate 58 which is in turn in contact with vessel 42. Since the plate is made of a heat conductive metal, such as copper or aluminum, and the vessel is made of stainless steel, for sanitary reasons, the cold surface of the thermoelectric module which is in contact with plate 58 causes the chilling of all of the metal which is either directly or indirectly in contact therewith. The hot surface of thermoelectric module 68 is in contact with cooling fins 64. Thus the heat generated will be dissipated through all of the fins. The heat generated is then expelled by means of fan 74. Thus, as seen in FIG. 2, fan 74 will draw air through foraminous section 232, as shown by arrows 246, and pass the air down through the fins as shown by arrows 248. After passing through the fins, the air passes downwardly through housing 12, across the motor 128, across transformer 226 and choke 227 and finally out through foraminous section 234. In this manner fan 74 serves to cool the entire interior of the housing.

It is thus seen that modules 68 are extremely small in size. They will effectively serve their intended function without the necessity of providing any moving parts to accomplish the chilling operation. Additionally, in view of their small size and the fact that they can be placed in substantially any space, it is possible to completely insulate the chilled vessel 42, as shown by the fact that foam insulation 82 substantially completely surrounds the vessel and its container 54.

One of the features of this invention is the provision of heat insulating loop 52. Thus, it is seen that vessel 42 is spaced from top plate 26 by hole 40. Additionally, the vessel will not rest on the top plate in view of the provision of loop 52. If the vessel were to rest on the top plate, the lowered temperature of the vessel would be transmitted to the top plate and thus to the housing 12, thereby causing cold loss and moisture condensation on the housing. However by the provision of enlarged hole 40 and loop 52 all of the cold is maintained within vessel 42. Insulating cover 18 prevents any loss of cold through the top of the housing.

When it is desired to obtain cream or any other liquid from the dispenser of this invention, this is accomplished by pushing actuating plate 14 inward as shown by arrow 246. As will be explained hereinafter, this will cause rotation of motor 128 which will in turn cause the rotation of output shaft 140 of gears 134. This in turn will cause the rotation of cam 142 which is secured to shaft 140 by set screw 168. As seen in FIG. 7, cam 146 is aligned with cam 142 and held in this position by pivot arm 150, plate 152, and disk 174 which engages pin 170. As the shaft 140 rotates, the aligned cams will contact roller 124 which, as was previously pointed out, is rotatably mounted between pivot arms 118. As shaft 140 continues to rotate, roller 124 will be depressed, thereby depressing the lower portion of the pivot arm, as shown by arrow 250 in FIG. 7. During this rotation, plate 152 will be rotated along with the cams since the plate is also secured to shaft 140. The rotation of the plate is indicated by arrow 252. When the lower portions of pivot arms 118 are depressed the upper portions will be rotated counterclockwise around pin 116, as shown by arrow 254. With the upper portions moving in the direction of arrow 254 they will bear against collar 110 on rod 100 thereby compressing spring 114 and moving the rod to the left. As seen in FIG. 2 the movement of rod 100 to the left, as shown by arrow 256, permits the opening of flexible tube 48. With the tube so opened, the liquid in vessel 42 will flow by the force of gravity through the lower end of bore 92.

The valve will remain in its open position so long as the upper arcuate surfaces of cams 142 and 146 are in contact with roller 124. However, once these surfaces have rotated past the roller, spring 114 will force rod 100 to the right, thereby reclosing the valve at 244. Each time the motor starts, the valve will be reopened by the process described above.

It is thus seen that the amount of cream which will be dispensed through tube 48 is directly dependent upon the length of time rod 100 is out of contact with the tube. This length of time is in turn directly dependent upon the length of time cams 142 and 146 are in contact with roller 124. Therefore, when it is desired to increase the amount of cream being dispensed, it is a simple matter using the device of this invention to merely increase the effective size of cams 142 and 146. In this connection, it should be noted that in the position shown in FIG. 7, the smallest amount of liquid that would ever be desired would be obtained by the setting of the cams shown therein. The effective size of the cams is increased by loosening disk 174 and pin 170. This permits the rotation of pivot arm 150 around tubular boss 148. As seen in FIG. 5, boss 148 is freely rotatable around boss 144. By the movement of pin 170 in slot 172, pivot arm 150 can be rotated from any position at the top of slot 172 (FIG. 7) to any position adjacent the bottom of slot 172 (FIG. 8). When the pivot arm is so moved cam 146 is similarly moved. Thus as seen in FIG. 8 the effective length of cams 142 and 146 has been almost doubled by the movement of the pivot arm. Since cams 142 and 146 have identical arcuate surfaces, the two cams provide a continuous arcuate surface when they are moved relative to one another as shown in FIG. 8.

When the cams are set in the position shown in FIG. 8 they will be in contact with roller 124 a substantially greater time than when they are set in the position shown in FIG. 7. Thus, so long as the arcuate surfaces of cams 142 or 146 are in contact with roller 124, the valve at 244 will remain open. In this manner the amount of liquid emanating from the dispenser can easily be controlled by merely adjusting the effective length of the cams. Cam 146 is maintained in its set condition by merely tightening disk 174 on pin 170.

As previously pointed out, plate 238 is removable from back plate 24 by merely removing screws 240. With the plate removed, it is a relatively simple matter to insert a human hand through opening 236 to gain access to adjustment disk 174 on the cams. Once the desired adjustment has been made, plate 238 is replaced and the dispenser will continue to work effectively to deliver the pre-set amount until the adjustment is changed again in the manner described above.

Figure 9:
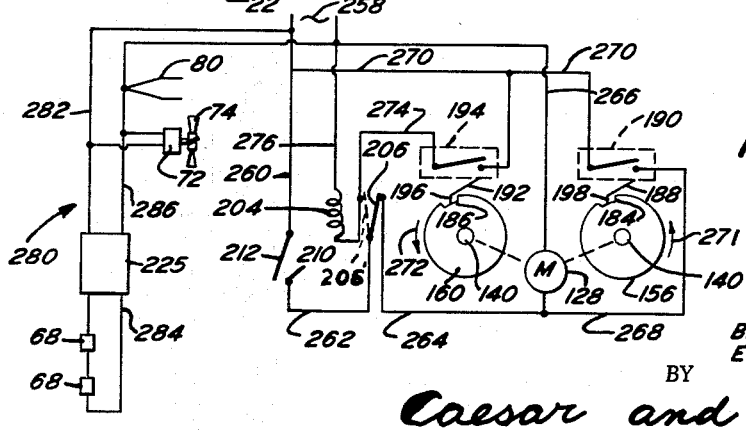
FIG. 9 is a wiring diagram for the dispenser of this invention.

The circuitry for controlling the dispenser of this invention is shown schematically in FIG. 9. One of the features of this circuitry is the fact that it has a built-in safety feature. Therefore, once the actuating plate 14 has been pushed, only one pre-determined amount of liquid will be delivered through tube 48. Thus this circuitry includes an automatic shutoff. This shutoff is effective even if the user inadvertently leaves a heavy object leaning against plate 14. Thus, even with continued pressure against contact finger 212, there will still only be one delivery of liquid. The dispenser will not make any delivery until pressure has been removed from plate 14 and reapplied.

The circuitry basically comprises a 110 volt source of alternating current 258. This current is conveniently supplied through lead wires 228 (FIGS. 1 and 2). The current passes through lead 260 to switch 210 having contact finger 212 (FIG. 2). When plate 14 is depressed finger 212 mechanically closes switch 210, thereby permitting current to pass through the switch to lead 262 and to contact arm 206 of relay 204. Contact arm 206 is normally electrically connected to lead 264. The current passes through lead 264 enters motor 128. The circuit is completed through lead 266 which connects the motor with the other incoming line at voltage source 258. It is thus seen that so long as switch 212 is depressed, the motor circuit will be complete and the motor will start its rotational movement.

As seen in FIG. 5, disks 156 and 160 are keyed to output shaft 140. Thus whenever the motor is running, shaft 140 will likewise be rotating. This in turn causes the rotational movement of disks 156 and 160. As seen in FIG. 9, whenever lips 196 and 198 are in the recesses of the disks, microswitches 194 and 190 respectively will be open. However, the rotation of disks 160 and 156 will force the lips 196 and 198 out of the recesses and onto the circumferences of the disks. This causes the raising of resilient fingers 188 and 192, thereby closing microswitches 190 and 194, respectively.

Since the recesses in the disks comprise a relatively small portion of the circumferences of the disks, microswitches 190 and 194 will be closed almost instantaneously after finger 212 has been depressed. Considering first disk 156, it is seen that once motor 128 has started rotating, microswitch 190 will be closed. Thus current will pass through lead 264 and through lead 268 to microswitch 190. Current leaving microswitch 190 passes through lead 270 which is tied in with incoming lead 260. With the microswitch 190 circuit completed, motor 128 will continue to run regardless of whether switch 212 is manually closed. This is because a motor circuit has been completed which includes lead 260, lead 270, microswitch 190, lead 268 and lead 266.

Having the above described circuitry, motor 128 will continue to rotate so long as microswitch 190 is closed. However, once disk 156 has completed one revolution in the direction of arrow 271, lip 198 will fall into recess 184 thereby automatically opening the microswitch. In this way, an automatic shutoff is provided for the motor, thereby preventing further dispensing of cream until finger 212 is depressed again.

The system described above will effectively insure that only one predetermined amount of cream will be dispensed whenever finger 212 is depressed in most instances. However, there is always the possibility that a solid object will be left against plate 14 or that a waitress will maintain her hand on plate 14 inadvertently. In such case, the motor would normally continue to rotate since the circuit for starting the motor would be continually closed. Thus this invention contemplates means for preventing continuous dispensing of liquid should the situation described in this paragraph be encountered. Thus, if switch 210 is inadvertently held closed, only one pre-set amount of cream will be dispensed until the switch is opened and reclosed. This result is accomplished by the provision of disk 160. As pointed out above, disk 160 is also secured on shaft 140. Thus when motor 128 is started by the closing of switch 210, disk 160 will rotate in the direction of arrow 272. As soon as lip 196 is pushed out of recess 186 by the rotation of the disk, microswitch 194 will close. With the microswitch so closed, current will pass through lead 270, through the microswitch 194, and through lead 274 to relay 204, thereby energizing a magnetic coil within the relay. As soon as this occurs, contact arm 206 is drawn from the position shown in FIG. 9 in full line to the position shown in phantom at 206' in FIG. 9. The circuit through the relay is completed by lead 276 which returns to the source of voltage. Thus, so long as microswitch 194 is closed, contact arm 206 will be in contact with relay 204.

While arm 206 is held against the relay, if switch 210 were manually closed, this would have no effect on the motor since the primary motor circuit would now be broken by the shifting of arm 206. However, motor 128 is kept rotating by the circuit passing through microswitch 190. As soon as disk 160 makes a complete revolution, lip 196 will be received in recess 186 thereby reopening microswitch 194. At that time contact arm 206 will return to the position shown in full line in FIG. 9, and the reclosing of switch 210 will again cause the dispensing of liquid. If, however, switch 210 is inadvertently held closed throughout an entire cycle, the motor cannot start a new cycle. This is because the primary circuit would be broken in view of the shifting of contact arm 206. With switch 210 held closed a circuit is completed through relay 204 which comprises lead 260, switch 210, lead 262, contact arm 206, the relay, and lead 276. Thus, even if microswitch 194 is opened by the completion of one revolution by disk 160, the contact arm 206 will still be held against the relay by the circuit including switch 210. As soon as pressure is taken from finger 212, contact arm 206 will return to its original position thereby permitting the restarting of motor 128.

It should also be noted that recess 184 is slightly smaller than recess 186. Thus when the motor is started, microswitch 190 will be closed slightly before microswitch 194. This permits the motor to obtain its full operating speed before the primary motor circuit is disengaged by the closing of microswitch circuit 194. It should also be noted that once the microswitches 190 and 194 are closed, switch 210 no longer has any effect on the operation of the motor since this operation will now be controlled by disk 156 which serves as a timer.

The actual time of operation for the dispensing of a pre-determined amount of liquid is easily controlled by suitable gearing in combination with motor 128. However, it has been found that a complete cycle time of slightly less than three seconds is most convenient. However this time can be adjusted to suit the needs of the user.

The cooling system is generally shown at 280 in FIG. 9. Thus the motor current passes through lead 282 into power conversion and transformer system 225. This system includes a transformer which lowers the voltage from approximately 110 volts to four volts. It also includes rectifiers and a choke to change the current from alternating to direct. This system is used because thermoelectric modules operate at low voltage and on direct current. Systems of this type and for this purpose are in common usage and any of those well known in the art can be used. For example, the power conversion and transformer system described in Engineering Bulletin No. 603 of Stancor Electronics, Inc., Chicago, Illinois, may be used. Any other system including a transformer, two solid state rectifiers and a choke, may be used. The current leaving system 225 passes through thermoelectric modules 68 which, incidentally, are always arranged in series. The current leaving module 68 passes through lead 284, through system 225 and through lead 286 back to the power source. Thermostatic control 80 is placed on the return line and serves to open and close the circuit as the refrigeration demands require. Fan 74 and its motor 72 are also connected into refrigeration lines 282 and 286.

It is thus seen that the dispenser of this invention provides a means of dispensing refrigerated liquid automatically. The amount of liquid to be dispensed is fully adjustable and can be maintained at any pre-set volume. The action of rod 100 against tube 48 insures that the dispenser will be drip-proof in operation. Since the refrigeration is accomplished electrically, there is never any fear of spoilage caused by inadvertent neglect to supply a consumable refrigerant, such as ice.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A dispenser comprising a casing, a vessel mounted within said casing for containing liquid, means for delivering liquid from said vessel, valve means on said delivery means, said valve means comprising a compressible tube and a rod which is spring biased against said tube, said rod being reciprocably mounted, said rod including bearing means mounted thereon, pivot means within said casing for bearing against said bearing means, whereby the depression of said spring means will result in the opening of said valve, and adjustable means which are external of said vessel for automatically opening and closing said valve means to deliver a set amount of liquid through said valve means.

2. The dispenser of claim 1 wherein said pivot means comprises at least one arm pivotally mounted within said casing, said arm having a first end bearing against said bearing means and a second end having a cam follower thereon with the pivot point being intermediate said first and second ends, and cam means within said housing for pivoting said arm.

3. The dispenser of claim 2 wherein said cam means are adjustable.

4. The dispenser of claim 3 wherein said cam means comprise a first cam and a second cam having identical arcuate outer cam surfaces, said first cam being keyed to a rotatable shaft, said second cam being rotatable about said shaft, and means for securing said second cam in a set position relative to said first cam.

5. The dispenser of claim 4 wherein said second cam has a pivot arm associated therewith and said securing means comprises a plate keyed to said shaft, said plate having an arcuate slot cut therein, said pivot arm which is associated with said second cam having means engageable in said slot, and means for securing said engageable means at a set position within said slot.

6. The dispenser of claim 2 wherein a pair of pivot arms are provided, said pivot arms being spaced on opposite sides of said rod, with said cam follower comprising a roller rotatably mounted between said pivot arms.

7. The dispenser of claim 4 and further including electrically responsive means for rotating said shaft.

8. A dispenser comprising a casing, a vessel mounted within said casing for containing liquid, means for delivering liquid from said vessel, valve means on said delivery means, adjustable means which are external of said vessel for automatically opening and closing said valve means to deliver a set of amount of liquid through said valve means, and means for cooling said vessel, said cooling means comprising at least one thermoelectric module, said vessel being mounted within a metallic container, said vessel being removable from said container, and said container having said thermoelectric module mounted thereon.

9. The dispenser of claim 8 wherein said container is spaced from said casing by thermal insulation material.

10. The dispenser of claim 9 wherein said vessel includes a lip which is supported by said casing, said casing being metallic, with a thermal insulation material separating said lip from said casing.

11. The dispenser of claim 10 and further including a removable cover over said vessel, said cover including a thermal insulation material.

12. The dispenser of claim 8 and further including heat conductive fins mounted against said thermoelectric module on the side opposite said container, and means for circulating air through said fins.

13. The dispenser of claim 12 wherein said casing includes at least one side having foraminous portions therein, whereby outside air can be circulated by the air circulating means into and through said casing.

14. A dispenser comprising a casing, a vessel mounted within said casing for containing liquid, means for delivering liquid from said vessel, valve means on said delivery means, adjustable means and electrical switch means associated with said casing and external of said vessel for causing the opening of said valve means, said electrical switch means including first switch means for instituting said opening of said valve means, second switch means which are actuated by said first switch means, said second switch means being in circuit with means for timing a dispensing cycle, and third switch means for deactivating said first switch means after a set period of time.

15. A dispenser comprising a casing, a vessel mounted within said casing for containing liquid, means for delivering liquid from said vessel, valve means on said delivery means, adjustable means and electrical switch means associated with said casing and external of said vessel for causing the opening of said valve means, said electrical switch means including first switch means for instituting said opening of said valve means, second switch means which are actuated by said first switch means, said second switch means being in circuit with means for timing a dispensing cycle, said first switch means being manually actuated, said first switch means adapted to cause the rotation of a motor shaft, means on said motor shaft for causing the opening of said valve means, and means on said motor shaft for closing said second switch means.

16. The dispenser of claim 15 wherein said closing means comprises a disk, said disk having a recess formed in the circumference thereof, said second switch means including a resilient finger having a lip received within said recess, whereby the rotation of said shaft causes the rotation of said disk, thereby forcing said lip out of said recess and closing said second switch means.

17. The dispenser of claim 16 wherein said motor is also on a circuit including said second switch means whereby said motor will continue to operate regardless of whetther said first switch means is closed, so long as said lip is out of said recess.

18. The dispenser of claim 15 and further including third switch means for deactivating said first switch means after a set period of time.

19. The dispenser of claim 18 and further including means on said motor shaft for closing said third switch means.

20. The dispenser of claim 19 wherein each of said closing means comprises a disk, each of said disks having a recess formed in the circumference thereof, said second and third switch means each including a resilient finger received in the recess of its respective disk, whereby the rotation of said shaft causes the rotation of said disks thereby forcing said lips out of said recesses and closing said second and third switch means.

21. The dispenser of claim 20 wherein said third switch means is in a circuit including coil means, whereby the closing of said third switch means energizes said coil means thereby electrically deactivating said first switch means by attraction of fourth switch means in the circuit of said first switch means.

22. The dispenser of claim 21 wherein said circuit of said first switch means continues to energize said coil means so long as said circuit is closed.

23. A dispenser comprising a remotely openable and closable valve and a control system, said control system including first switch means, valve opening means, said first switch means being in circuit with said valve opening means and adapted to cause the opening of said valve, second switch means which are actuated by said first switch means, said second switch means being in circuit with means for timing the dispensing cycle, and third switch means for deactivating the valve opening circuit of said first switch means by bypassing said valve opening circuit, said first switch means being manually actuated and adapted to cause the rotation of a motor shaft, means on said motor shaft for causing the opening of said valve, means on said motor shaft for closing said second switch means, said closing means comprising a disk, said disk having a recess formed in the circumference thereof, said second switch means including a resilient finger having a lip received within said recess, whereby the rotation of said shaft causes the rotation of said disk, thereby forcing said lip out of said recess and closing said switch means, said motor also being on a circuit including said second switch means, whereby said motor will continue to operate regardless of whether said first switch means is closed, so long as said lip is within said recess.

24. A dispenser comprising a remotely openable and closable valve and a control system, said control system including first switch means, valve opening means, said first switch means being in circuit with said valve opening means and adapted to cause the opening of said valve, second switch means which are actuated by said first switch means, said second switch means being in circuit with means for timing the dispensing cycle, and third switch means for deactivating the valve opening circuit of said first switch means by bypassing said valve opening circuit, said first switch means being manually actuated and adapted to cause the rotation of a motor shaft, means on said motor shaft for causing the opening of said valve, means on said motor shaft for closing said second switch means, and means on said motor shaft for closing said third switch means.

25. The invention of claim 24 wherein each of said closing means comprises a disk, each of said disks having a recess formed in the circumference thereof, said second and third switch means each including a resilient finger received in the recess of its respective disk, whereby the rotation of said shaft causes the rotation of said disk thereby forcing said lips out of said recess and closing said second and third switch means.

26. The invention of claim 25 wherein said third switch means is in a circuit including coil means, whereby the closing of said third switch means energizes said coil means thereby electrically deactivating said first switch means by attraction of fourth switch means in the circuit of said first switch means.

27. The invention of claim 26 wherein said circuit of said first switch means continues to energize said coil means so long as said circuit is closed.

28. A dispenser comprising a casing, a metallic container within said casing, said container having thermoelectric cooling means associated therewith, a vessel mounted within said metallic container, means for delivering liquid from said vessel, valve means on said delivery means, said valve means comprising a compressible tube and a rod which is spring biased against said tube, means within said casing for bearing against said rod, to compress said spring, whereby said valve will be opened by the release of pressure against said compressible tube, electrical switch means associated with said casing for causing the opening of said valve means, said electrical switch means comprising first switch means for instituting said opening of said valve means and second switch means which are actuated by said first switch means, said second switch means being in circuit with means for adjusting the amount of liquid to be dispensed in any given cycle.

References Cited by the Examiner

UNITED STATES PATENTS

| | | | |
|---|---|---|---|
| 1,338,782 | 5/1920 | Lindahl | 251—7 X |
| 2,609,966 | 9/1952 | Henry | 222—70 |
| 2,616,607 | 11/1952 | Perkins | 222—504 X |
| 2,681,751 | 6/1954 | Stone et al. | 222—70 X |
| 2,838,077 | 6/1958 | Cooper | 222—70 X |
| 2,872,078 | 2/1959 | Kennedy | 222—511 X |
| 2,957,607 | 10/1960 | Smith | 222—70 |
| 3,031,102 | 4/1962 | Storms | 222—70 X |
| 3,049,142 | 8/1962 | Oliver | 137—624.17 X |
| 3,088,289 | 5/1963 | Alex | 62—3 |
| 3,119,527 | 1/1964 | Dyer | 222—70 |
| 3,160,318 | 12/1964 | Steiner et al. | 222—70 X |

M. HENSON WOOD, Jr., *Primary Examiner.*

LOUIS J. DEMBO, *Examiner.*